United States Patent
Tresidder

(10) Patent No.: US 9,569,395 B2
(45) Date of Patent: Feb. 14, 2017

(54) FAST EXIT FROM LOW-POWER STATE FOR BUS PROTOCOL COMPATIBLE DEVICE

(71) Applicant: ATI Technologies ULC, Markham (CA)

(72) Inventor: Michael J. Tresidder, Newmarket (CA)

(73) Assignee: ATI TECHNOLOGIES ULC, Markham, Ontario (CA)

(*) Notice: Subject to any disclaimer, the term of this patent is extended or adjusted under 35 U.S.C. 154(b) by 0 days.

(21) Appl. No.: 14/801,977

(22) Filed: Jul. 17, 2015

(65) Prior Publication Data

US 2015/0324318 A1 Nov. 12, 2015

Related U.S. Application Data

(62) Division of application No. 13/627,230, filed on Sep. 26, 2012, now Pat. No. 9,117,036.

(51) Int. Cl.
| | |
|---|---|
| *G06F 1/04* | (2006.01) |
| *G06F 13/42* | (2006.01) |
| *G06F 13/28* | (2006.01) |
| *G06F 1/32* | (2006.01) |

(52) U.S. Cl.
CPC ......... *G06F 13/4221* (2013.01); *G06F 1/3203* (2013.01); *G06F 1/3228* (2013.01); *G06F 13/287* (2013.01); *G06F 13/42* (2013.01); *G06F 13/4295* (2013.01); *G06F 2213/0026* (2013.01); *Y02B 60/1228* (2013.01); *Y02B 60/1235* (2013.01)

(58) Field of Classification Search
CPC ..................................... G06F 1/04; G06F 1/10
USPC .................................................. 713/500, 600
See application file for complete search history.

(56) References Cited

U.S. PATENT DOCUMENTS

| | | | |
|---|---|---|---|
| 5,404,544 A | 4/1995 | Crayford | |
| 7,188,263 B1 | 3/2007 | Rubinstein et al. | |
| 7,313,712 B2 | 12/2007 | Cherukuri et al. | |
| 7,607,029 B2 | 10/2009 | Tseng et al. | |
| 7,607,031 B2 | 10/2009 | Mackey et al. | |
| 7,984,314 B2 | 7/2011 | Cooper et al. | |
| 8,312,304 B2 | 11/2012 | Kwa et al. | |
| 8,689,028 B2 | 4/2014 | Diefenbaugh et al. | |
| 8,782,321 B2 | 7/2014 | Harriman et al. | |
| 9,117,036 B2* | 8/2015 | Tresidder | G06F 13/42 |
| 2006/0129733 A1* | 6/2006 | Sobelman | H04L 25/0262 710/305 |
| 2006/0262839 A1 | 11/2006 | Tseng et al. | |
| 2008/0118246 A1* | 5/2008 | Steidl | H04L 27/2075 398/98 |
| 2009/0279889 A1 | 11/2009 | Kirkpatrick et al. | |

(Continued)

OTHER PUBLICATIONS

PCI Express Base Specification Revision 3.0, Nov. 10, 2010, Chapter 5 Power Management, pp. 413-458, published by PCI-SIG.
Actions on the Merits in U.S. Appl. No. 13/627,230.

*Primary Examiner* — Chun Cao
(74) *Attorney, Agent, or Firm* — Polansky & Associates, P.L.L.C.; Paul J. Polansky

(57) ABSTRACT

A bus protocol compatible device includes an encoder having an input for receiving a local clock signal, and an output, a multiplexer having a first input for receiving a reference clock signal, a second input coupled to said output of said encoder, a control input for receiving a select signal, and an output, and a driver having an input coupled to said output of said multiplexer, and an output for coupling to a bus protocol link.

20 Claims, 3 Drawing Sheets

(56) References Cited

U.S. PATENT DOCUMENTS

2011/0222584 A1* 9/2011 Michaels ............ H04J 13/0018
375/130
2012/0020404 A1 1/2012 Hsieh et al.
2013/0007489 A1 1/2013 Unnikrishnan et al.

* cited by examiner

FAST EXIT FROM LOW-POWER STATE FOR BUS PROTOCOL COMPATIBLE DEVICE

This application is a division of U.S. patent application Ser. No. 13/627,230, filed Sep. 26, 2012, entitled "Bus Protocol Compatible Device and Method Therefor," which is hereby incorporated by reference herein in its entirety.

FIELD

This disclosure relates generally to computer devices, and more specifically to computer bus protocol compatible devices such as Peripheral Component Interconnect Express (PCIe) devices with power management capability.

BACKGROUND

Various computer bus protocols support low power states and specify wakeup sequences for individual devices to wake up other linked devices prior to communication. For example, the PCI Express (PCIe) standard provides certain protocols for link power management. The power management (PM) controller of a PCIe device responds to system software to transition through "D-states". In particular, after system reset, a PCIe device transitions to an uninitialized configuration state D0. Next, the system software completes the enumeration process. After enumeration, the PCIe device transitions to an active D0 state. The PCIe standard defines the power management state of the link based on a particular D-state of a downstream PCIe device.

A PCIe device transitions through link states (L-states), depending on the status and activity of the link. The PCIe standard defines link power management, L0, L0s (L0 standby), L1, L2, and L3. For additional power savings, a PCIe device changes its operation from the fully operative L0 state, to an increased latency, low power L1 state, and ultimately to an off-link L3 state.

The PCIe standard also defines Active State Power Management (ASPM). ASPM is based on a Physical Layer (PHY) protocol to place an idle bus link in a low-power communication state, and ASPM supports L-state transitions. A PCIe device following the ASPM hardware-based protocol supports L-state transitions even when operating in the active D0 state. According to ASPM protocol, a PCIe device reduces its power consumption on its side of the link, and instructs a downstream PCIe device to reduce power on the downstream side of the link.

When a PCIe device begins to transition from the low power communication L1 state to the fully operative L0 state, the PCIe device will exchange training sequences with a downstream PCIe device. A PCIe device provides encoded training sequences using 8b (bit)/10b encoding when the data rate is 2.5 GT/s (gigatransfers per second) or 5.0 GT/s. A PCIe device provides encoded training sequences using a per-lane code along with Physical Layer encapsulation for data rates greater than or equal to 8.0 GT/s. Training sequences include information such as the skew between all lanes within a multi-lane link. When both PCIe devices transition to the L0 state, the PCIe devices have enabled their ability to transmit active traffic on the link.

The PCIe standard defines three discrete logical layers, the Transaction Layer, the Data Link Layer, and the Physical Layer. The Transaction Layer manages Transaction Layer Packets (TLPs) between the Physical Layers of two PCIe devices. The Data Link Layer manages the link and the integrity of the data transferred on the link. Also, the Data Link Layer transmits and receives link management Data Link Layer Packets (DLLPs). For a PCIe device, the PHY includes all circuitry for interface operation, such as the transmitter, the receiver, and the logic to control the power state transitions.

Continued performance pressure has led to increasing requirements for lower latency communication and improved power management for PCIe devices. It would be desirable for PCIe devices to decrease the period of time to transition between power management states.

DETAILED DESCRIPTION OF ILLUSTRATIVE EMBODIMENTS

Generally, a bus protocol compatible device for a communication system is capable of assuming a low power state and waking from the low power state based on either a local wakeup event or detected activity of a linked device. During the low power state, the bus protocol compatible device powers down certain circuits such as phase locked loops (PLLs), which require a certain amount of time to re-lock before the bus protocol compatible device can return to normal operation. A bus protocol compatible device as disclosed below, however, is able to shorten the wakeup time by providing a reference clock signal on the link before its internal circuits power up that the other station can use to detect activity. For example, a PCIe compatible device has a transmitter that provides the PCIe Refclk signal as an early, in-band indicator to a linked device to indicate that it will transition from the standby L1 Link state to the active L0 Link state. In this way, both devices facilitate parallelism and reduced latency during their transitions to the L0 Link state. The overall lock time is reduced to a time substantially equal to the longer of the two lock times.

Figure 1:
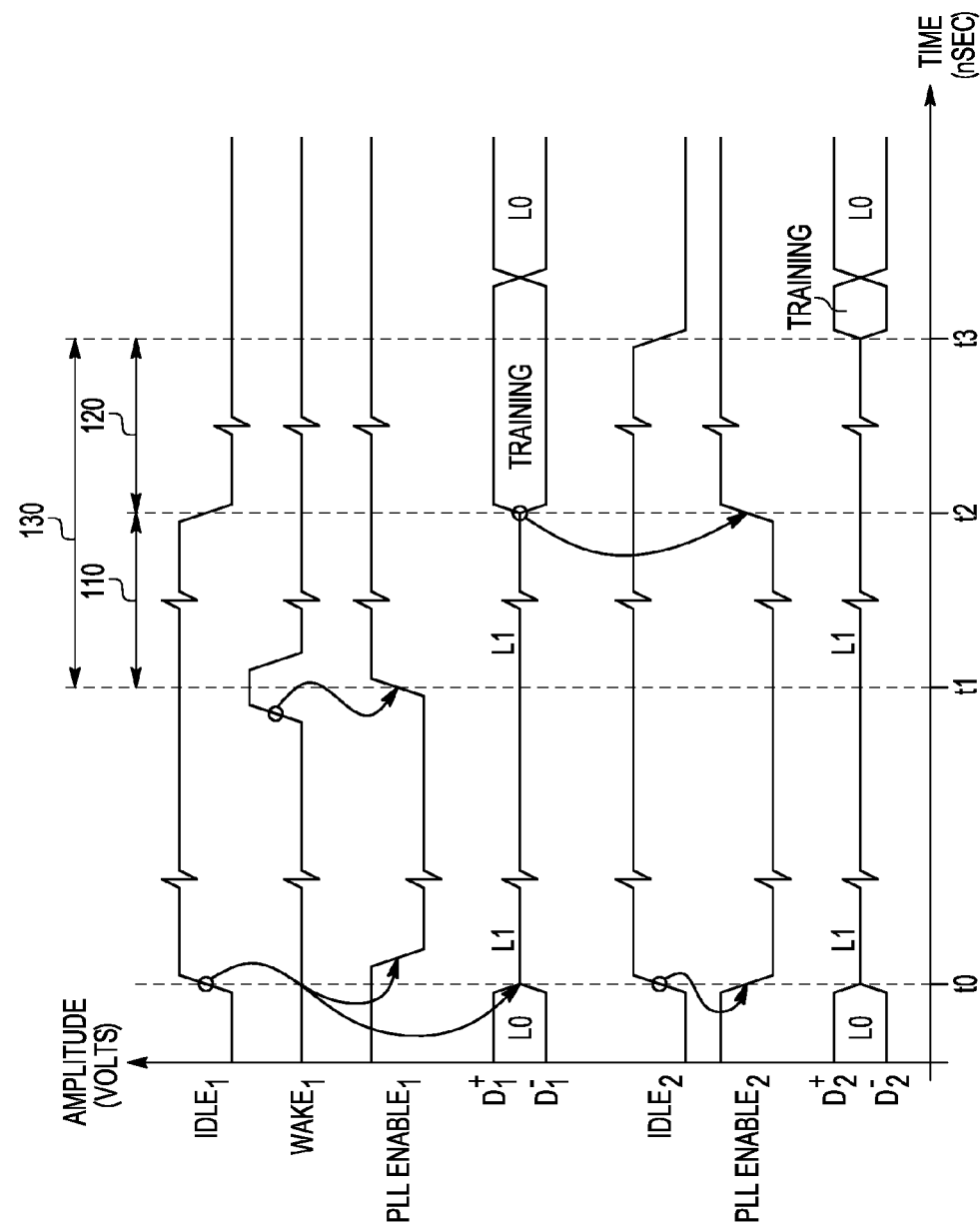
FIG. 1 illustrates a timing diagram useful in understanding the operation of a PCIe system known in the prior art.

FIG. 1 illustrates a timing diagram 100 useful in understanding the operation of a PCIe system known in the prior art. The horizontal axis represents time in nanoseconds (nsec), and the vertical axis represents amplitude in volts. The timing diagram illustrates seven waveforms of interest, a waveform labeled "IDLE$_1$", a waveform labeled "WAKE$_1$", a waveform labeled "PLL ENABLE$_1$", a waveform labeled "D$_1^+$, D$_1^-$", a waveform labeled "IDLE$_2$", a waveform labeled "PLL ENABLE$_2$", and a waveform labeled "D$_2^+$, D$_2^-$". The horizontal axis illustrates four particular time points of interest, labeled "t0", "t1", "t2", and "t3", and three time periods of interest including a lock time 110, a lock time 120, and an overall lock time 130. Also, timing diagram 100 illustrates two L-states of interest, labeled "L0" and "L1", and training sequences during periods labeled "TRAINING".

A PCIe compatible source provides a 100 Megahertz (Mhz) reference clock signal labeled "Refclk" to a PCIe device TX local PLL. When a PCIe device PM controller asserts signal PLL ENABLE to the TX local PLL at around time t1, the TX local PLL will "spin up" and operate during a lock time to lock its local clock to signal Refclk. The PM controller negates signal PLL ENABLE to save additional power when the PCIe device transitions from the L0 Link state to the L1 Link state.

A Link is a dual simplex communications path between two PCIe devices. A PCIe device transmits data over a differential pair of signals $D_1^+$, $D_1^-$ to a linked PCIe device and receives data over a differential pair of signals $D_2^+$, $D_2^-$ from the linked PCIe device.

PCIe devices communicate with linked PCIe devices on the Link using "in-band" signaling for events and conditions that generally do not use extra pins of a PCIe device. Also, PCIe devices communicate with linked PCIe devices using separate physical signals, referred to as "sideband" or "out-of-band" signals. These signals are independent of the Link and generally are included as extra pins on a PCIe device.

In operation, FIG. 1 shows a first PCIe device ("PCIe$_1$") and a second downstream PCIe device ("PCIe$_2$") initially in the L0 Link state. At around time t0, the PM controller of PCIe$_1$ asserts IDLE$_1$ and the PM controller of PCIe$_2$ asserts IDLE$_2$. In response, PCIe$_1$ and PCIe$_2$ transition to the L1 Link state. At around time t1, PCIe$_1$ receives control signal WAKE$_1$ signal to request a transition from the L1 Link state to the L0 Link state. The PCIe$_1$ PM controller asserts PLL ENABLE$_1$, but continues to assert IDLE$_1$ during lock time 110 of the PCIe$_1$ TX local PLL. At around time t2, the PCIe$_1$ TX local PLL locks, the PCIe$_1$ PM controller negates signal IDLE$_1$, and PCIe$_1$ initiates transmission of training sequences to PCIe$_2$. The PCIe$_2$ PM controller continues to assert IDLE$_2$ during lock time 120 of its TX local PLL. At around time t3, the PCIe$_2$ TX local PLL locks, the PCIe$_2$ PM controller negates IDLE$_2$, and PCIe$_2$ initiates transmission of training sequences to PCIe$_1$. At a certain period of time after t3, PCIe$_1$ and PCIe$_2$ complete transmitting training sequences, and PCIe$_1$ and PCIe$_2$ both transition to the L0 Link state.

However, since PCIe$_1$ first indicates to PCIe$_2$ that PCIe$_1$ is transitioning to the L0 Link state, when PCIe$_1$ transmits training sequences to PCIe$_2$, time period 130 includes the "serializing" of the latency of lock time 110 in addition to lock time 120. When system software interrogates each PCIe device, including PCIe-PCIe switches, to determine the aggregate transition latency from an endpoint device to the root-complex device, if the aggregate latency exceeds the tolerance of devices on the link, the system software will not enable certain power-saving features, such as powering down TX local PLLs.

Figure 2:
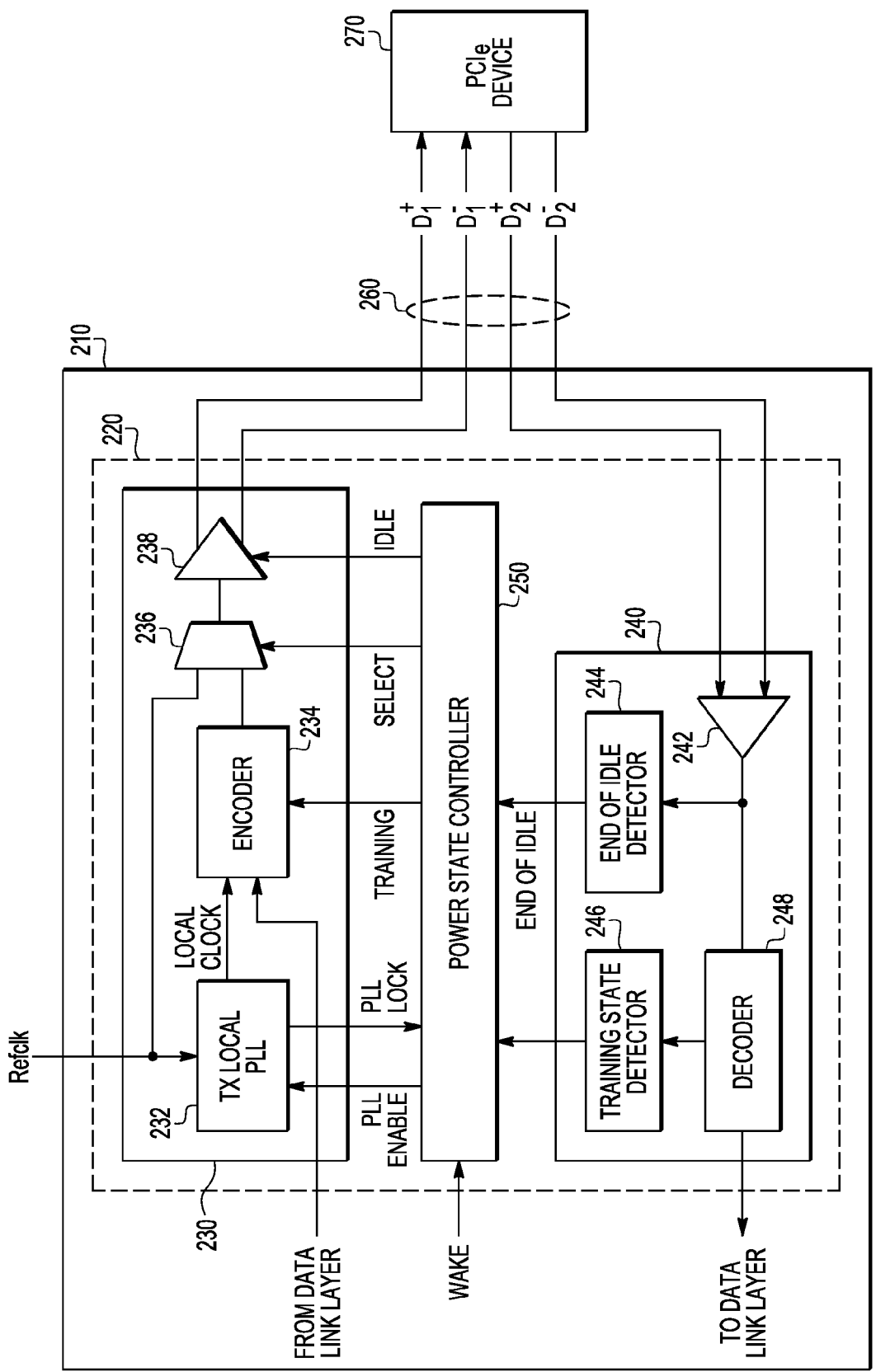
FIG. 2 illustrates in partial block diagram and partial schematic form a bus protocol compatible system including a bus protocol compatible device according to the present invention.

FIG. 2 illustrates in partial block diagram and partial schematic form a bus protocol compatible system 200 including a bus protocol compatible device 210 according to the present invention. In FIG. 2, bus protocol compatible system 200 is a PCIe system that in which bus protocol compatible device 210 is a PCIe device, a PCIe link 260, and a PCIe device 270. It should be appreciated that in other embodiments, device 210 could be adapted for operation in various other bus protocol compatible systems.

Device 210 includes a PHY 220 and data link layer circuitry, not shown in FIG. 2. PHY 220 includes a transmitter 230, a receiver 240, and a power state controller 250.

Transmitter 230 includes a TX (transmit) local phase locked loop (PLL) 232, an encoder 234, a multiplexer 236, and a driver 238. TX local PLL 232 has an input to receive a clock signal labeled "Refclk", an input to receive a signal labeled "PLL ENABLE", an output to provide a signal labeled "PLL LOCK", and an output to provide a signal labeled "LOCAL CLOCK". Encoder 234 has an input to receive signal LOCAL CLOCK, an input port to data from the data link layer, an input to receive a signal labeled "TRAINING", and an output. Multiplexer 236 has an input to receive signal Refclk, an input connected to the output of encoder 234, an input to receive a signal labeled "SELECT", and an output. Driver 238 has an input connected to the output of multiplexer 236, an input to receive a signal labeled "IDLE", and an output forming an egress port of PCIe device 210 to provide signals $D_1^+$, $D_1^-$.

Receiver 240 includes an input buffer 242, an end of idle detector 244, a training state detector 246, and a decoder 248. Input buffer 242 has an input forming an ingress port of PCIe device 210 to receive signals $D_2^+$, $D_2^-$, and an output. End of idle detector 244 has an input connected to the output of input buffer 242, and an output to provide a signal labeled "END OF IDLE". Training state detector 246 has an input, and an output. Decoder 248 has an input connected to the output of input buffer 242, an output connected to the input of training state detector 246, and an output port to provide data to the data link layer.

Power state controller 250 has an input to receive a signal labeled "WAKE", an output to provide PLL ENABLE, an input to receive signal PLL LOCK, an output to provide signal TRAINING, an output to provide signal SELECT, an output to provide signal IDLE, an input connected to the output of training state detector 246, and an input to receive signal END OF IDLE.

Link 260 is a dual unidirectional PCIe link, and device 270 has an ingress port connected to the egress port of device 210, and an egress port connected to the ingress port of device 210. Note that in the exemplary embodiment of FIG. 2, device 210 is shown as having a 1-bit link, but the principles disclosed herein apply to any supported link width.

In operation, device 210 is capable of saving power by entering a low-power inactive state. In this link power management state, driver 238 keeps its egress port in an electrical idle condition by driving both lines $D_1^+$ and $D_1^-$ to a DC common mode voltage. During wakeup from a low-power inactive state, transmitter 230 has a first mode to transmit signal Refclk from its egress port to the ingress port of device 270 over link 260. In particular, if device 210 wakes up while D2+, D2− are still in the idle state, circuitry in device 210 activates signal WAKE to power state controller 250, and power state controller 250 substantially simultaneously provides signal PLL ENABLE to TX local PLL 232, provides signal SELECT to multiplexer 236 to select Refclk, and negates signal IDLE to enable driver 238. Multiplexer 236 provides signal Refclk to driver 238, and driver 238 transmits signal Refclk to device 270 over signal lines $D_1^+$, $D_1^-$ of link 260.

TX local PLL 232 locks after a period of time and provides signal PLL LOCK to power state controller 250. Also, TX local PLL 232 provides signal LOCAL CLOCK to encoder 234 with a phase and frequency related to signal Refclk.

Transmitter 230 has a second mode to transmit training sequences from its egress port to the ingress port of device 270, over link 260. In particular, power state controller 250 provides signal TRAINING to encoder 234 and signal SELECT to multiplexer 236 to select the training sequences. Encoder 234 provides encoded training sequences to multiplexer 236 and multiplexer 236 provides the training sequences to driver 238. Driver 238 transmits the training sequences to PCIe device 270 over signals $D_1^+$, $D_1^-$ of link 260. At the completion of the training sequences phase, device 210 and PCIe device 270 transition to a fully operative active state.

When PCIe device 270 wakes up while device 210 is still in the idle state, PCIe device 270 transmits signal Refclk from its egress port to the ingress port of receiver 240, over link 260. In particular, PCIe device 270 provides signal Refclk to input buffer 242 over signals lines $D_2^+$, $D_2^-$ of link 260. Input buffer 242 provides a buffered Refclk signal to end of idle detector 244 and to decoder 248. End of idle detector 244 provides signal END OF IDLE to power state controller 250. Thus, end of idle detector 244 is capable of recognizing the presence of a relatively low frequency (100 MHz) signal on $D2^+$, $D2^-$. Power state controller 250 responds to signal END OF IDLE and substantially simultaneously provides signal PLL ENABLE to TX local PLL 232, provides signal SELECT to multiplexer 236 to select signal Refclk, and negates signal IDLE to driver 238. Multiplexer 236 provides signal Refclk to driver 238, and driver 238 transmits signal Refclk to PCIe device 270 over signal lines $D_1^+$, $D_1^-$ of link 260.

Next, PCIe device 270 transmits training sequences from its egress port to the ingress port of device 210 over link 260. Input buffer 242 provides buffered training sequences to end of idle detector 244 and to decoder 248. Decoder 248 decodes the training sequences, and provides them to training state detector 246. Training state detector 246 provides a signal to power state controller 250 indicating the detection of training sequences. Decoder 248 also provides data to the data link layer of PCIe device 210.

When TX local PLL 232 locks, it provides signal PLL LOCK to power state controller 250. Transmitter 230 then transmits training sequences from its egress port to the ingress port of PCIe device 270 over link 260. After both PLLs have locked and the devices have completed their training sequences, PCIe devices 210 and 270 transition to a fully operative state.

By providing signal Refclk as an early, in-band indicator from one device to another device to indicate the device will awaken from a low-power state, both devices facilitate "parallelism" and reduced latency during their transitions to the fully operative state. Training starts when the slowest to lock PLL has locked, rather than after both PLLs lock in sequence, significantly reducing wakeup latency. This latency reduction is greater in deeper PCIe topologies. Also, the parallelism will result in additional power savings, when system software interrogates each PCIe device, including PCIe-PCIe switches, to determine the aggregate transition latency from an endpoint device to the root-complex device.

Figure 3:
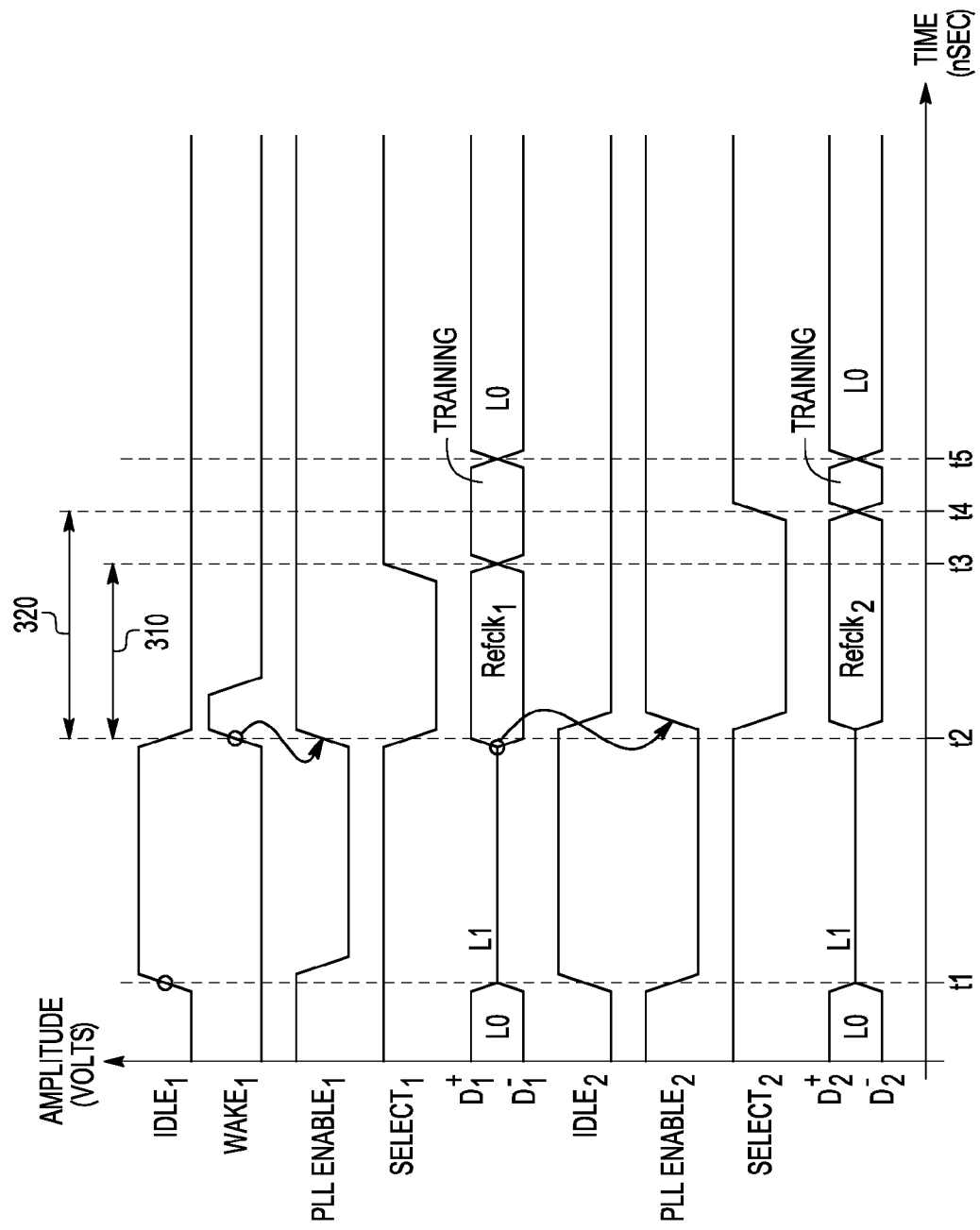
FIG. 3 illustrates a timing diagram useful in understanding the operation of the bus protocol compatible device of FIG. 2.

FIG. 3 illustrates a timing diagram useful in understanding the operation of the bus protocol compatible device of FIG. 2. The horizontal axis represents time in nanoseconds (nsec), and the vertical axis represents amplitude in volts. The timing diagram illustrates nine waveforms of interest, $IDLE_1$, $WAKE_1$, $PLL\ ENABLE_1$, a waveform labeled "$SELECT_1$", $D_1^+$, $D_1^-$, $IDLE_2$, $PLL\ ENABLE_2$, a waveform labeled "$SELECT_2$", and $D_2^+$, $D_2^-$. The horizontal axis illustrates five particular time points of interest, labeled "t1", "t2", "t3", "t4", and "t5", and two time periods of interest including a lock time 310 and a lock time 320. Also, timing diagram 300 illustrates two L-states of interest, L0 and L1, and signals TRAINING and Refclk.

In operation, device 210 and device 270 are initially in the L0 Link state. At around time t1, power state controller 250 asserts signal $IDLE_1$ and the PM controller of device 270 asserts $IDLE_2$. In response, device 210 and device 270 transition to the L1 Link state.

At around time t2, device 210 provides signal WAKE1 to device 270 to request a transition from the L1 Link state to the L0 Link state. Power state controller 250 substantially simultaneously provides signal PLL ENABLE to TX local PLL 232, provides signal SELECT to multiplexer 236 to select signal Refclk, and negates signal IDLE to enable driver 238. Driver 238 transmits signal Refclk to PCIe device 270 as an early indication that device 210 will initiate a transition to the L0 Link state.

A short period of time after time t2, PCIe device 270 properly interprets signal Refclk received from device 210, and the power state controller of device 270 substantially simultaneously provides signal PLL ENABLE to its TX local PLL, provides signal SELECT to its multiplexer to select signal Refclk, and negates signal IDLE to enable its driver. The driver of PCIe device 270 transmits signal Refclk to device 210 as an early indication that device 270 will also initiate a transition to the L0 Link state.

At around time t3, TX local PLL 232 locks, and device 210 initiates transmission of training sequences to device 270. At around time t4, the PLL in device 270 also locks, and device 270 initiates transmission of training sequences to device 210. At around time t5, device 210 and device 270 complete transmitting training sequences, and device 210 and device 270 both transition to the L0 Link state.

By providing signal Refclk as an early, in-band indicator from device 210 to device 270, that indicates device 210 will transition from the L1 Link state to the L0 Link state, both devices facilitate parallelism and reduced latency during their transitions to the L0 Link state. The overall lock time is reduced to time period 320, which is substantially equal to the longer of the two lock times.

Also, the parallelism may provide additional power savings. In a PCIe system, system software interrogates each PCIe device, including PCIe-PCIe switches, to determine the aggregate transition latency from an endpoint device to the root-complex device. If this latency is too large for the devices on the link, the system software may disable power saving features (such as powering down PLLs) in endpoints or intervening switches to meet latency requirements. By reducing transition latency, a system constructed as described herein could also permit these power saving features to be used, significantly reducing power consumption.

While the invention has been described in the context of a preferred embodiment, various modifications will be apparent to those skilled in the art. For example, system 200 is illustrated as a PCIe system, but the disclosed technique is applicable to reduce latency in other bus protocol compatible systems that use low power modes and circuitry having wakeup latency such as PLLs. Moreover device 210 could use the disclosed technique to transition between different power management states defined for the specific bus protocol. FIG. 2 illustrates TX local PLL 232 providing signal PLL LOCK to power state controller 250, but in alternate embodiments other types of circuits such as counters and analog delay lines could provide PLL LOCK after a sufficient amount of time. In addition, in FIG. 2 transmitter 230 transmits the PCIe Refclk signal to cause its link partner to detect an end of idle condition on the link, but in other embodiments, transmitter 230 could use other readily available toggling signals as the reference clock signal. Accordingly, it is intended by the appended claims to cover all modifications of the invention that fall within the true scope of the invention.

What is claimed is:

1. A bus protocol compatible device, comprising:
an encoder having an input for receiving a local clock signal, and an output;

a multiplexer having a first input for receiving a reference clock signal, a second input coupled to said output of said encoder, a control input for receiving a select signal, and an output, wherein said multiplexer is responsive to said select signal to select said reference clock signal in a first mode, and to select said output of said encoder in a second mode; and a driver having an input coupled to said output of said multiplexer, and an output for coupling to a bus protocol link.

2. The bus protocol compatible device of claim 1, further comprising:

a phase locked loop (PLL) having an input for receiving said reference clock signal, a control input for receiving a PLL enable signal, and an output for providing said local clock signal, wherein said PLL assumes an inactive state in response to an inactivation of said PLL enable signal, and resumes an active state a delay after an activation of said PLL enable signal.

3. The bus protocol compatible device of claim 2, further comprising:

a power state controller having a first output for providing said PLL enable signal according to a link state.

4. The bus protocol compatible device of claim 3, wherein:

said power state controller further has a second output for providing said select signal according to said link state.

5. The bus protocol compatible device of claim 4, wherein:

said PLL further has a second output for providing a PLL lock signal; and said power state controller, in response to a wake condition, activates said PLL enable signal, provides said select signal to select said first input of said multiplexer, and subsequently provides said select signal to select said second input of said multiplexer in response to said PLL lock signal.

6. The bus protocol compatible device of claim 5, further comprising:

a receiver for providing an end of idle signal, wherein said power state controller recognizes said wake condition in response to said end of idle signal.

7. The bus protocol compatible device of claim 6, wherein said receiver provides data to a data link layer.

8. The bus protocol compatible device of claim 7, wherein said power state controller operates substantially according to the Peripheral Component Interconnect (PCI) Express specification and deactivates said PLL enable signal when said link is in a PCI Express L1 Link state.

9. The bus protocol compatible device of claim 3, wherein:

said encoder is responsive to a training signal to provide a training sequence to said output; and said power state controller has a third output for providing said training signal, wherein said power state controller activates said training signal after said delay.

10. A bus protocol compatible system, comprising:

a bus protocol link;

a first bus protocol compatible device comprising:

an encoder having an input for receiving a local clock signal, and an output;

a multiplexer having a first input for receiving a reference clock signal, a second input coupled to said output of said encoder, a control input for receiving a select signal, and an output, wherein said multiplexer is responsive to said select signal to select said reference clock signal in a first mode, and to select said output of said encoder in a second mode; and a driver having an input coupled to said output of said multiplexer, and an output coupled to said bus protocol link, and a second bus protocol compatible device coupled to said bus protocol link.

11. The bus protocol compatible system of claim 10, wherein said first bus protocol compatible device further comprises:

a phase locked loop (PLL) having an input for receiving said reference clock signal, a control input for receiving a PLL enable signal, and an output for providing said local clock signal, wherein said PLL assumes an inactive state in response to an inactivation of said PLL enable signal, and resumes an active state a delay after an activation of said PLL enable signal.

12. The bus protocol compatible system of claim 11, wherein said first bus protocol compatible device further comprises:

a power state controller having a first output for providing said PLL enable signal according to a link state, and second output for providing said select signal according to said link state.

13. The bus protocol compatible system of claim 12, wherein:

said PLL further has a second output for providing a PLL lock signal;

said power state controller, in response to a wake condition, activates said PLL enable signal, provides said select signal to select said first input of said multiplexer, and subsequently provides said select signal to select said second input of said multiplexer in response to said PLL lock signal; and wherein said first bus protocol compatible device further comprises:

a receiver for providing an end of idle signal, wherein said power state controller recognizes said wake condition in response to said end of idle signal.

14. The bus protocol compatible system of claim 13, wherein said power state controller operates substantially according to the Peripheral Component Interconnect (PCI) Express specification and deactivates said PLL enable signal when said link is in a PCI Express L1 Link state.

15. The bus protocol compatible system of claim 12, wherein:

said encoder is responsive to a training signal to provide a training sequence to said output; and said power state controller has a third output for providing said training signal, wherein said power state controller activates said training signal after said delay.

16. A method of operating a bus protocol compatible device comprising:

encoding a data signal according to a local clock signal to provide an encoded data signal;

multiplexing a reference clock signal and said encoded data signal to provide a multiplexed signal in response to a select signal, wherein said multiplexing comprises selecting said reference clock signal in a first mode, and selecting said encoded data signal in a second mode; and driving said multiplexed signal onto a bus protocol link.

17. The method of claim 16 further comprising:

generating said local clock signal from said reference clock signal in a phase locked loop (PLL);

inactivating said PLL in response to an inactivation of a PLL enable signal;

activating said PLL a delay after an activation of said PLL enable signal; and providing said PLL enable signal and said select signal according to a link state.

18. The method of claim 17 further comprising:

in response to a wake condition:
- activating said PLL enable signal according to said link state;
- providing said select signal to select said reference clock signal;
- locking said PLL;
- providing said select signal to select said encoded data signal subsequently to said locking;
- activating a training signal after said locking; and
- providing a training sequence as said encoded data signal in response to said training signal.

19. The method of claim 18 further comprising:

receiving an end of idle signal in response to a condition of said bus protocol link; and recognizing said wake condition in response to said end of idle signal.

20. The method of claim 17 further comprising:

deactivating said PLL enable signal when said link is in a PCI Express L1 Link state.

\* \* \* \* \*